United States Patent [19]

Langmaid

[11] Patent Number: 4,894,925
[45] Date of Patent: Jan. 23, 1990

[54] EXTENDABLE LEVEL

[75] Inventor: Jonathan C. Langmaid, Yalmouth, Me.

[73] Assignee: Jonathan C. Langmaid, Inc., Yarmouth, Me.

[21] Appl. No.: 218,886

[22] Filed: Jul. 14, 1988

[51] Int. Cl.$^4$ .............................................. G01C 9/28
[52] U.S. Cl. ........................................ 33/374; 33/381; 33/464
[58] Field of Search ................... 33/374, 376, 451, 464

[56] References Cited

U.S. PATENT DOCUMENTS

| 684,846 | 10/1901 | Moss | 33/374 |
|---|---|---|---|
| 1,413,056 | 4/1922 | Parrish et al. | 33/374 |
| 2,419,451 | 4/1947 | Keller | 33/374 |
| 2,551,524 | 5/1951 | Bullivant | 33/374 |
| 3,238,887 | 7/1967 | Wright | 33/374 |
| 3,243,888 | 4/1966 | Redding | 33/374 |
| 3,889,353 | 6/1975 | Provi | 33/381 |
| 4,130,943 | 12/1978 | Talbot | 33/374 |
| 4,463,501 | 8/1984 | Wright et al. | 33/350 |
| 4,607,437 | 8/1986 | McSorgey, Sr. et al. | 33/374 |
| 4,643,951 | 2/1987 | Keem et al. | 428/472 |

FOREIGN PATENT DOCUMENTS

| 0646251 | 11/1984 | Switzerland | 33/374 |
|---|---|---|---|
| 1185590 | 3/1970 | United Kingdom | 33/374 |

Primary Examiner—William A. Cuchlinski, Jr.
Assistant Examiner—Thomas B. Will
Attorney, Agent, or Firm—Auslander & Thomas

[57] ABSTRACT

An extendable level consists of two interslidable parts having a track and slide strips in a simple construction, wherein there is always a planar relationship between the level edges. The slidable extension rests within the length of the main body when unextended.

18 Claims, 2 Drawing Sheets

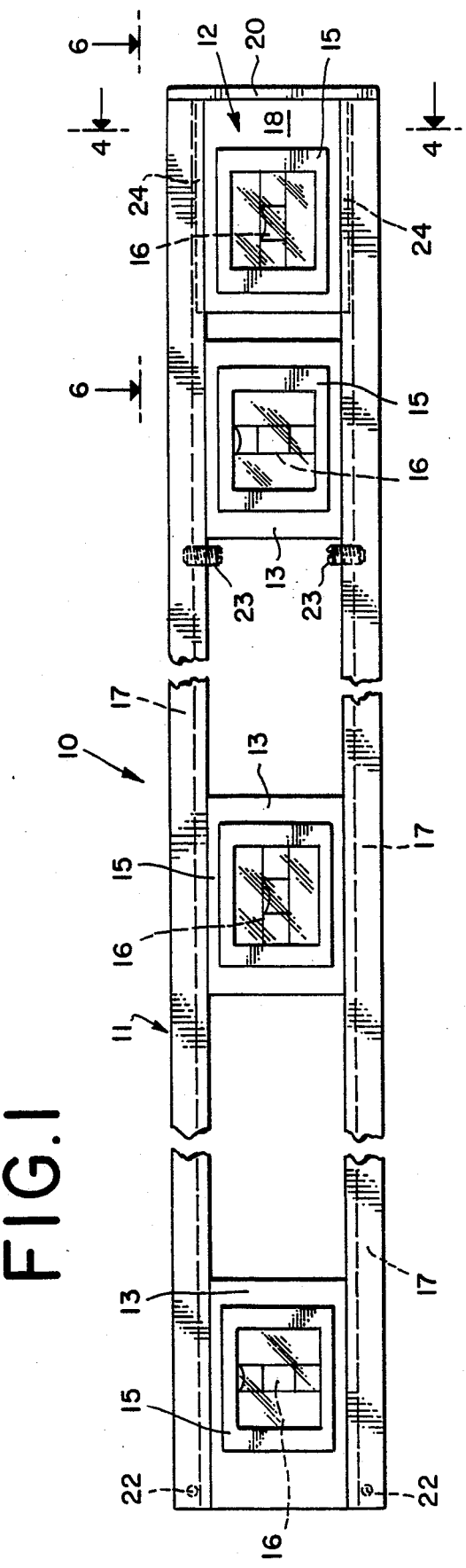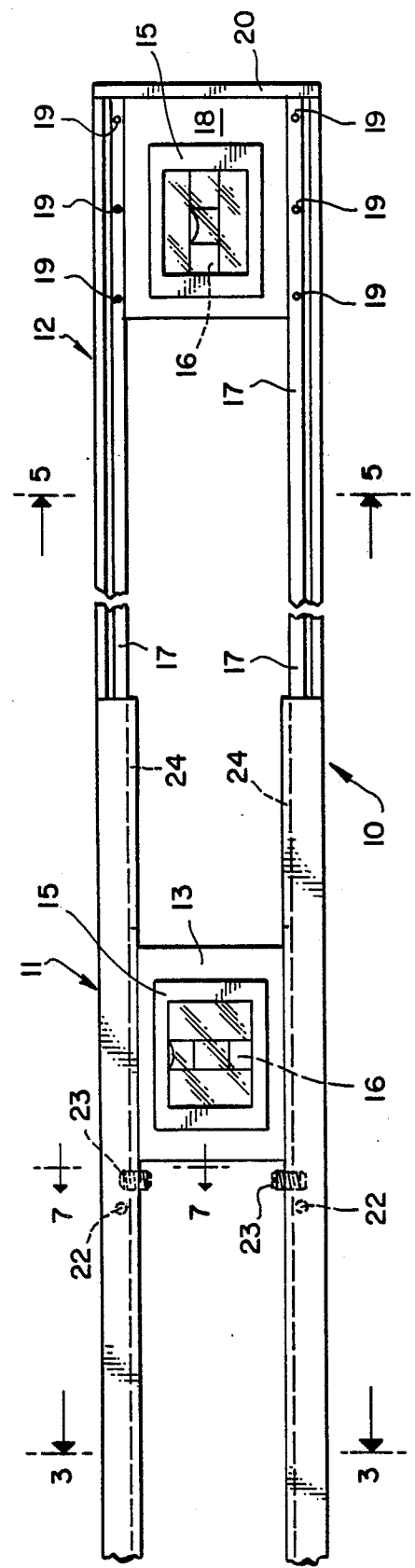

EXTENDABLE LEVEL

BACKGROUND OF THE INVENTION

This invention relates to an improved extendable level. Leveling devices oftentimes pose substantial problems in terms of combining accuracy with convenience. A level further is desirably small enough to be conveniently carried or carried in a conventional tool kit, yet extendable for needs, particularly in construction. Thus, generally extendable levels of the past extend from a range of twenty-eight inches to a maximum of four feet.

One of the problems involved with extendable levels is primarily involved with the stability and accuracy of the level, once it is extended. Mere extendability of a level does not guarantee its accuracy. It is desirable to have a level plane along the entire edge length of the level when it is extended, so that all intermediate irregularities can be picked up by the level.

Many levels of the past have succeeded in providing extendability and have even succeeded in providing the plane relationship between the level and the area against which it is used, with regard to the extended level. Within this area, it is also necessary to take into account the stability of the extended level in terms of protection against slippage, twisting and torsion, among other things.

Levels of the past have even dealt with such problems. The solutions of the past, though, have been complex and expensive to effectuate and difficult to adjust or repair. The parts themselves, by virtue of their extendability, are oftentimes structurally weak.

THE PRESENT INVENTION

The present invention provides an extendable level of a few simple, sturdy parts, assemblable into a simple, strong, effective level, which can be relatively inexpensively constructed. The extended level maintains itself in its selected position. The level of the present invention can easily be repaired, if necessary. It is inexpensive to repair and maintain.

The present invention comprises a basic main body or trough, preferably having upper and lower track portions and central webbing between the tracks. The central webbing is adapted to receive bubble vial mounting assemblies for vertical and horizontal bubble vials. The webbing is preferably inset from the width of the main body with openings through the main body between the webs. The main body may have cut outs defining the webs. A slidable extension comprises slide strips adapted to slide in the tracks. The slide strips are joined by a webbing preferably adapted to receive a bubble vial mounting assembly.

The level is preferably in two portions with four mounted bubble vials, one bubble vial in the webbing of the slidable extension and three in the main body. The tracks in the main body are open along the longitudinal edge on a level plane. Slide strips engaged in the tracks have a longitudinal surface along the same level plane as the tracks so that on extension of the level there is a contiguous level plane. The slide strips are firmly held by the tracks and hold their selected position. The end of the slidable extension includes a cap that spans the level and acts as a grip and covers the track ends of the main body. The other ends of the main body tracks are open.

In a preferred embodiment of the present invention the main body comprises an extruded piece of aluminum stock which is die cut, defining the webbing supporting the bubble vial mounting assemblies. The webbing is die cut with openings for the bubble vial mounting assemblies. The slidable extension comprises slide strips which are preferably extruded, then joined to a webbing for the bubble vial mounting assembly. Particularly when the aluminum parts are given a hard oxide coating they wear well and slide easily yet hold their extended position.

DESCRIPTION OF THE PRIOR ART

The prior art has well considered extendable levels, extending from about two feet to four feet, including levels whose extended lengths include straight planes with the main portion, or main body of the level.

In the prior art, U.S. Pat. No. 4,130,943 is typical of extendable levels with complex structures and multi-parts, where even the extended level provides a level plane between its parts. The structure, though, includes many pieces and further requires incremental stop locks.

In the prior art, U.S. Pat. No. 2,419,451, discloses a very complex, multi-part extendable level, which, while maintaining a plane as extended, requires extensive adjustment and parts and is necessarily expensive to produce.

In the prior art, U.S. Pat. No. 2,551,524, while providing a relatively simple, extendable level, has failed to provide an uninterrupted plane between the end portion and extendable portion and only provides a compensating projection to overcome this shortcoming. While the telescoping portion includes side pieces with undercut dove-tailed grooves, to enable the intersliding of the parts, the sliding of the parts does not solve the problem of simplicity, nor the contiguous planar relationship between the portions of the extension level.

In the prior art, U.S. Pat. No. 4,435,908 discloses an extendable level with interslidable parts of a very complex structure, yet it does not have a full planar relationship between the main portions of the level along its extended length.

In the prior art, U.S. Pat. No. 2,879,606 provides an extendable level with extendable sleeves and a complex locking mechanism.

Accordingly a primary object of the present invention is to provide an extendable level with a minimum of parts.

Another object of the present invention is to provide an extendable level having a contiguous planar relationship between the extended parts.

Another object of the present invention is to provide an extendable level having an extruded main body die cut to accept bubble vial mounting assemblies and a slidable extension comprising extruded slide strips slidable in the main body tracks, the slidable extension being held together by a web.

Another object of the present invention is to provide an extendable level with a minimum number of parts, while maintaining maximum accuracy.

A BRIEF SUMMARY OF THE INVENTION

According to the present invention an extendable level includes a main body including tracks for slide strips in a slidable extension. The main body preferably is extruded aluminum, with planar longitudinal edges and a central webbing. The main body is preferably die cut to define webbings. The webbings are die cut with openings to accept assemblies for mounting the bubble vials. The die cut accurately positions the bubble vials in the bubble vial mounting assemblies in the main body. The slide strips in the tracks maintain a planar relationship between the main body and the slidable extension. The slidable extension preferably incudes a bubble vial mounting assembly including a bubble vial held in an accurate working relationship with regard to the main body.

An extendable level having a main body and an slidable extension have longitudinal edges with level planes. The main body and slidable extension fit together with a track and slide strip configuration. Part of the track and part of the slide strip reach the edges so that the level plane is contiguous whether the level is in closed position or extended. The track and slide strip interslide. Bubble vials are conventionally mounted in the level.

The main body may include a webbing away from the longitudinal edge, as well as the slidable extension including a webbing away from its longitudinal edge. The main body and slidable extension are adapted to interfit within the length of said main body so as to minimize the unextended length of the level. The tracks and slide strips may be of aluminum and have a hard coating of aluminum oxide. The coating prevents wear and also helps the main body and slidable extension hold their selected relative positions, closed or extended. An end cap on the slidable extension also serves as a hand grip for extending the slidable extension. Stop means between the track and slide strip maintain then from separation. In a preferred embodiment the track is open at one end which serves to help free the track of matter that might clog or wear. Preferably, the track and slide strip are in T configurations which assist the grasping of the slide strip within the track and allows the longitudinal edges of both to be on a level plane that is contiguous when the parts are extended. When the slide strip is extruded aluminum it is generally fixed to a webbing. The webbing in the main body and slidable extension preferably serve to mount the bubble vials in bubble vial assemblies.

The extendable level of course preferably has symmetrical parallel longitudinal edge pairs.

Although such novel feature or features believed to be characteristic of the invention are pointed out in the claims, the invention and the manner in which it may be carried out may be further understood by reference to the description following and the accompanying drawings.

BRIEF DESCRIPTION OF THE DRAWING

FIG. 1 is a broken elevation of the extendable level of the present invention.

FIG. 2 is a detail elevation of FIG. 1 showing the extension of the level.

Referring now to the figures in greater detail, where like reference number denote like parts in the various figures.

DETAILED DESCRIPTION

Figure 3:
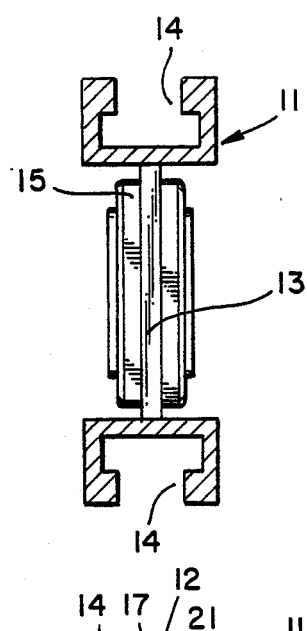
FIG. 3 is a section of FIG. 2 at lines 3—3.

The extendable level 10 as shown in FIGS. 1 and 2 comprises a main body 11 with an interactive slidable extension 12. The main body 11, as shown in FIG. 1, ha three webs 13, tracks 14, bubble vial mounting assem blies 15 in the webs 13, with bubble vials 16 held withi the bubble vial mounting assemblies 15. The slidabl extension 12 has two slide strips 17, which slide withi the tracks 14.

As shown in FIGS. 1 and 2, the slide strips 17 ar assembled on a web 18 with screws 19. The web in cludes a bubble vial 16 in a bubble vial mounting assem bly 15. An end cap 20 at the end of the slidable exten sion 12 is mounted by means well known in the art, sucl as screws (not shown). The web 18, screws 19 and en cap 20 rigidly hold the slide strips 17 in an integra slidable extension 12, slidable within the tracks 14 an not subject to distortion.

Figure 4:
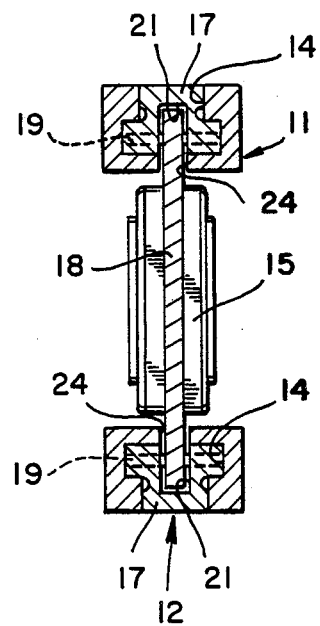
FIG. 4 is a section of FIG. 1 at lines 4—4.
Figure 7:
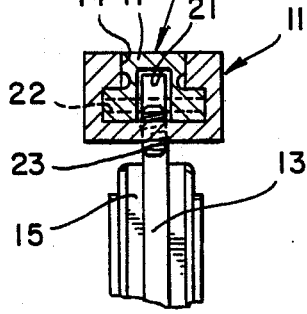
FIG. 7 is a detail of FIG. 2 at lines 7—7.
Figure 5:
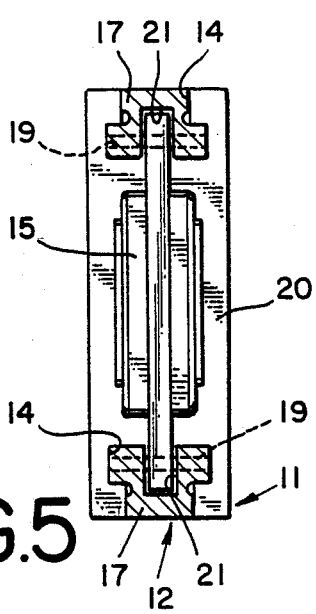
FIG. 5 is a section of FIG. 2 at lines 5—5.

As can be seen in FIGS. 4, 5 and 7, the slide strips 1 have a longitudinal groove 21. The web 18 fits into th groove 21 and is held by screws 19, maintaining th rigid integrity of the slidable extension 12, properl mounting the bubble vial mounting assembly 15 wit the bubble vial 16.

Figure 6:
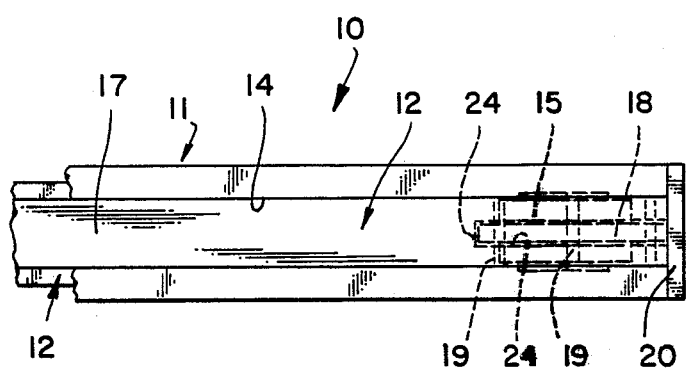
FIG. 6 is a detail view of FIG. 1 at lines 6—6.

As shown in FIGS. 1 and 7, screws 22 are mounted the end of slide strips 17 through the groove 21. Thes screws 22 interact with screws 23 which pass into th tracks 14 through the undersides of the tracks 14 t interact with the screws 22 to form a stop to prevent th slidable extension 12 from becoming detached from th main body 11. The screws 23 may protrude, as showr or be flush with the underside of the track 14. The mai body 11 is provided with slots 24 at one end, whic open into the track 14. As can be seen in FIGS. 1, 2, and 6, the slots 24 are adapted to receive the ends of th web 18 so that the slidable extension 12 with the web 1 fit flush together with the end of the main body 11 wit the cap 20 at the end of the main body 11, also servin as a stop.

The bubble vials 16 are containable in bubble vi: mounting assemblies 15, which are well known in th art, and are adapted to accept the bubble vials 16, eith vertically or horizontally within the extendable leve The bubble vial mounting assemblies 15 fit into oper ings in the webs 13, 18 and generally include (the detai not shown) frames screw attachable to each oth across either side of the web holding mounting fram internal thereof with a bubble either horizontal or vert cal.

In a preferred embodiment, the main body 11 is single extrusion of aluminum, punch die cut to defir the webs 13 and the openings in the webs 13, adapted receive the bubble vial assemblies 15.

In a preferred embodiment, the track 14 and slic strip 17 are in mating T or inverted T configuration The track 14, into which the slide strip 17 fits is ope along a plane. Thus, with the slide strip 17 on a lev plane with the open track upon the extension of tl level, there is always a contiguous plane portion alon the extendable level. The level is always responsive any surfaces off the plane, even when extended.

In the preferred embodiment, the level is from 24 28 inches, unextended, and extends to a length of fo feet. An overlap of eight inches at maximum displac ment, provides sufficient rigidity in a full extensic mode to eliminate undesired flexing. The end cap : serves as a gripper to provide a convenient place to ho the level while extending or retracting. The end cap 20 also can serve as a level plane. The extendable level 10 is preferably three and one-half inches high and one inch thick.

In the preferred embodiment, the extendable level 10 is of aluminum, which has received a hard coating of aluminum oxide about one thousandth of an inch thick. This hard coating prevents wear and also allows sliding of the slide strip 17 in the tracks 14, while the level itself maintains the position to which it has been extended.

The other end of the main body 11 is open, as can be seen in FIG. 3. Thus, the slide strip 17 in the tracks 14 cannot entrap undesirable particles. They can fall free from the ends of the main body 11. The construction materials are chosen to be weather and corrosion resistant and all extruded components are aluminum and all fasteners are stainless steel.

The extendable level 10 with its main body 11 and slidable extension 12 do not necessarily have to be of extruded aluminum. They must have a close tolerance to slide in a true relationship with the bubble vials 16 in the central web 13 of the main body 11. The mating of the tracks 14 and slide strips 17 does not necessarily have to be in an exact T configuration, but there must be a longitudinal opening in the track 14 for the slide strips 17 to open to the same plane as the track 14 and the edges of the extendable level 10. In use, the extendable level 10 is used in its retracted position. By grasping the end cap 20, the slidable extension 12 is extended to a length up to 4 feet.

The extendable level 10 is relatively inexpensive to manufacture because of the simplicity of its parts and is accurate over its length, even when extended and because of the close tolerance mating of the slide strips 17 in the tracks 14. The extendable level 10 dispenses with the need for other complicated mechanisms. The level is easy to maintain and repair. The bubble vials 16 and/or the bubble vial mounting assemblies 15 are easily replaced. The bubble vials 16 themselves may be reset within the bubble vial mounting assemblies 15.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. An extendable level comprising a main body and a slidable extension, said main body including a longitudinal edge, said main body's longitudinal edge including a level plane, said main body including a webbing, said slidable extension including a slide strip, said slide strip including a longitudinal edge, said slide strip's longitudinal edge including a level plane, said slidable extension including a webbing, a track, said track in said main body's longitudinal edge, said slide strip and track adapted to interslide, said main body and slide strip having a contiguous level plane along said respective longitudinal edges, said extendable level including a plurality of bubble vials, and said track in said main body's longitudinal edge including a slot adapted to receive said slidable extension's webbing extending from said slide strip.

2. The invention of claim 1 wherein said main body and slidable extension are adapted to interfit within the length of said main body.

3. The invention of claim 1 wherein at least said tracks and slide trips are of aluminum and have a hard coating of aluminum oxide.

4. The invention of claim 3 wherein said main body and slidable extension are adapted to hold their selected relative position.

5. The invention of claim 1 including an end cap on said slidable extension.

6. The invention of claim 1 including stop means, said stop means adapted to maintain said slide strip in said track.

7. The invention of claim 1 wherein said track is open at one end.

8. The invention of claim 1 wherein said track and slide are in a T configuration.

9. The invention of claim 1 wherein said main body is an aluminum extrusion, said slidable extension including an extruded aluminum slide strip, said slide strip fixed to said webbing.

10. An extendable level comprising a main body and a slidable extension, said main body including a pair of longitudinal edges, said main body's longitudinal edges including level planes, said main body including a webbing, said slidable extension including a pair of slide strips, said slide strips including longitudinal edges, said slide strips' longitudinal edges including level planes, said slidable extension including a webbing, tracks, said tracks in said main body's longitudinal edges, said slide strips and tracks adapted to interslide, said main body and slide strips having contiguous level planes along said respective longitudinal edges, said extendable level including a plurality of bubble vials, and said tracks in said main body's longitudinal edges including slots adapted to receive said slidable extension's webbing extending from said slide strips.

11. The invention of claim 10 wherein said main body and slidable extension are adapted to interfit within the length of said main body.

12. The invention of claim 10 wherein at least said tracks and slide strips are of aluminum and have a hard coating of aluminum oxide.

13. The invention of claim 12 wherein said main body and slidable extension are adapted to hold their selected relative position.

14. The invention of claim 10 including an end cap on said slidable extension.

15. The invention of claim 10 including stop means, said stop means adapted to maintain said slide strips in said tracks.

16. The invention of claim 10 wherein said tracks are open at one end.

17. The invention of claim 10 wherein said tracks and slides are in a T configuration.

18. The invention of claim 10 wherein said main body is an aluminum extrusion, said slidable extension including extruded aluminum slide strips, said slide strips fixed to said webbing.

* * * * *